US010065530B2

(12) United States Patent
Zhao et al.

(10) Patent No.: US 10,065,530 B2
(45) Date of Patent: Sep. 4, 2018

(54) SYSTEM AND METHOD FOR SENSORLESS REMOTE RELEASE ACTUATING SYSTEM

(71) Applicant: Leggett & Platt Canada Co., Halifax (CA)

(72) Inventors: Xiao Ming Zhao, Windsor (CA); Renato Colja, Windsor (CA); Horia Blendea, LaSalle (CA)

(73) Assignee: LEGGETT & PLATT CANADA CO., Halifax, Nova Scotia (CA)

( * ) Notice: Subject to any disclaimer, the term of this patent is extended or adjusted under 35 U.S.C. 154(b) by 1107 days.

(21) Appl. No.: 13/841,825

(22) Filed: Mar. 15, 2013

(65) Prior Publication Data
US 2014/0265991 A1 Sep. 18, 2014

(51) Int. Cl.
*B60N 2/02* (2006.01)
(52) U.S. Cl.
CPC .................................. *B60N 2/0232* (2013.01)
(58) Field of Classification Search
CPC ........... H04N 5/23293; H04N 5/23222; B60N 2/0232; B60N 2002/0236
USPC ............... 318/268, 685, 626; 297/217.1, 285
See application file for complete search history.

(56) References Cited

U.S. PATENT DOCUMENTS

| 3,311,802 | A | * | 3/1967 | Schenk | ........................... 318/61 |
| 5,197,780 | A | | 3/1993 | Coughlin | |
| 5,334,876 | A | * | 8/1994 | Washeleski et al. | ........ 307/10.1 |
| 5,765,884 | A | * | 6/1998 | Armbruster | ............. E05B 81/20 292/1 |
| 5,836,639 | A | * | 11/1998 | Kleefeldt | ................ E05B 81/22 296/155 |

(Continued)

FOREIGN PATENT DOCUMENTS

| CN | 1940786 | 1/2007 |
| CN | 1935559 | 3/2007 |

(Continued)

OTHER PUBLICATIONS

International Search Report and Written Opinion of the International Searching Authority, International Patent Application No. PCT/CA2014/000184, dated May 27, 2014.

(Continued)

*Primary Examiner* — Bentsu Ro
*Assistant Examiner* — Devon Joseph
(74) *Attorney, Agent, or Firm* — Michael Best & Friedrich LLP

(57) ABSTRACT

A method for configuring a controller to operate a motor to position a seat, in which the controller includes an integrated current sensor and the seat includes a latch operatively coupled to the motor, includes determining an operating profile of the motor under one or more operating conditions, wherein the operating profile represents motor current values during activation of the latch, and wherein the activation of the latch includes at least one latch pulling condition and one latch release condition. The method further includes analyzing the operating profile in order to correlate the profile to the position of the latch. The method also includes loading the controller with instructions to enable comparison of a real-time current measured by the integrated current sensor to the stored operating profile, wherein the analysis enables determination of the latch condition in real-time.

18 Claims, 7 Drawing Sheets

(56) References Cited

U.S. PATENT DOCUMENTS

| | | | | |
|---|---|---|---|---|
| 6,115,666 | A * | 9/2000 | Ng | F02D 41/0097 |
| | | | | 701/115 |
| 6,195,603 | B1 * | 2/2001 | Gauger | B60N 2/0248 |
| | | | | 296/68.1 |
| 6,316,892 | B1 * | 11/2001 | Valencia | E05F 15/611 |
| | | | | 318/293 |
| 6,339,302 | B1 * | 1/2002 | Greenbank | B60N 2/0228 |
| | | | | 318/103 |
| 6,727,689 | B1 * | 4/2004 | Furlong | G01D 5/2448 |
| | | | | 324/166 |
| 7,367,624 | B2 | 5/2008 | Garland | |
| 7,521,818 | B2 | 4/2009 | Bergmann et al. | |
| 7,556,315 | B2 * | 7/2009 | Nathan | B60N 2/0224 |
| | | | | 297/378.1 |
| 7,614,701 | B2 | 11/2009 | Liang et al. | |
| 8,348,003 | B2 | 1/2013 | Morishita et al. | |
| 8,907,791 | B2 * | 12/2014 | Yulkowski | E05F 15/40 |
| | | | | 340/540 |
| 2003/0009892 | A1 | 1/2003 | Scheibner et al. | |
| 2003/0080699 | A1 * | 5/2003 | Rumney | B60N 2/002 |
| | | | | 318/9 |
| 2003/0227203 | A1 | 12/2003 | Mundell | |
| 2005/0285551 | A1 * | 12/2005 | Stewart et al. | 318/268 |
| 2006/0022630 | A1 * | 2/2006 | Spurr | E05B 81/06 |
| | | | | 318/650 |
| 2006/0087276 | A1 * | 4/2006 | Silitonga | 318/685 |
| 2006/0097560 | A1 * | 5/2006 | Keyser | B60N 2/3011 |
| | | | | 297/378.12 |
| 2006/0108849 | A1 * | 5/2006 | Liang | B60N 2/0244 |
| | | | | 297/361.1 |
| 2006/0220600 | A1 * | 10/2006 | Greene | B60N 2/0232 |
| | | | | 318/126 |
| 2006/0220660 | A1 * | 10/2006 | Ninagawa | G06F 17/50 |
| | | | | 324/663 |
| 2006/0250016 | A1 * | 11/2006 | Wang | B60N 2/002 |
| | | | | 297/408 |
| 2007/0067083 | A1 * | 3/2007 | Shen | B60N 2/0248 |
| | | | | 701/49 |
| 2007/0067084 | A1 * | 3/2007 | Shen | B60N 2/0248 |
| | | | | 701/49 |
| 2007/0090670 | A1 * | 4/2007 | Garland | B60N 2/01583 |
| | | | | 297/285 |
| 2007/0236067 | A1 * | 10/2007 | Nathan | B60N 2/0224 |
| | | | | 297/378.12 |
| 2008/0093833 | A1 * | 4/2008 | Odate | B60R 22/44 |
| | | | | 280/807 |
| 2010/0259120 | A1 | 10/2010 | Karaki et al. | |
| 2010/0268133 | A1 | 10/2010 | Samain | |
| 2011/0087392 | A1 * | 4/2011 | Kshatriya | 701/22 |
| 2013/0200668 | A1 * | 8/2013 | Michalak | B60N 2/0232 |
| | | | | 297/217.1 |
| 2014/0191553 | A1 * | 7/2014 | Blendea | B60N 2/20 |
| | | | | 297/354.1 |
| 2015/0059249 | A1 * | 3/2015 | Yulkowski | E05F 15/50 |
| | | | | 49/31 |

FOREIGN PATENT DOCUMENTS

| | | | | |
|---|---|---|---|---|
| EP | 0581509 | A1 * | 2/1994 | H02H 7/0851 |
| JP | H07-208008 | A | 8/1995 | |
| JP | 2007-056496 | A | 3/2007 | |
| JP | 2009-208555 | A | 9/2009 | |
| JP | 2012-218524 | A | 11/2012 | |
| WO | 02/092385 | A1 | 11/2002 | |

OTHER PUBLICATIONS

Chinese Patent Office Action for Application No. 201480016271.4 dated Mar. 30, 2017 with English Translation (16 pages).
Chinese Patent Office Action for Application No. 201480016271.4 dated Dec. 27, 2017, with English Translation, 16 pages.

* cited by examiner

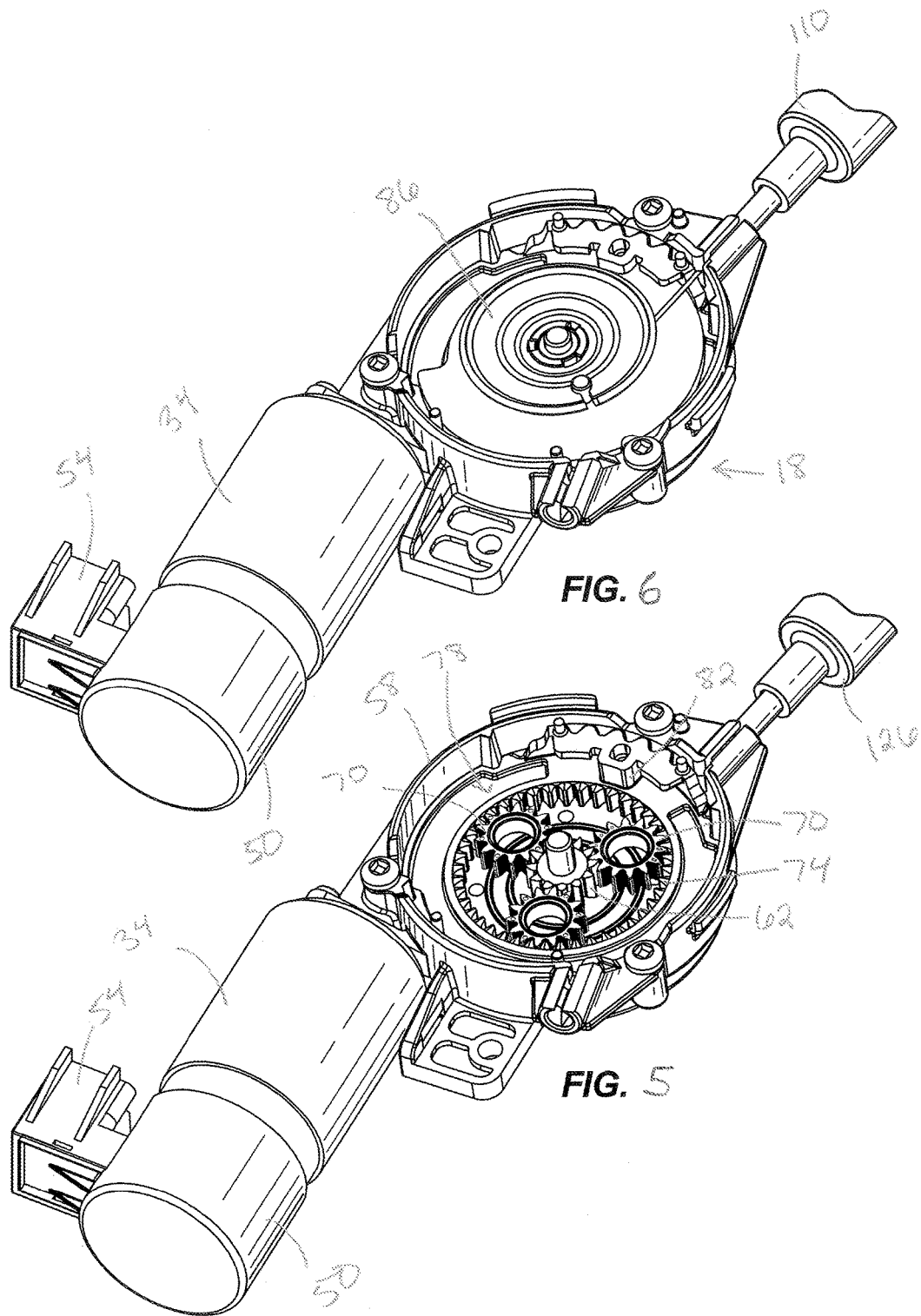

SYSTEM AND METHOD FOR SENSORLESS REMOTE RELEASE ACTUATING SYSTEM

BACKGROUND

The present invention relates to a remote release actuating system for retracting and releasing a cable.

Many conventional actuating systems, such as those for seat adjustment, use an external position sensor (e.g. an encoder, resolvers, hall-effect sensors, potentiometers, etc.) to provide positional feedback to a controller. While operationally sufficient for this purpose, external position sensors add additional cost and weight to the system and are often susceptible to failure.

SUMMARY

In one embodiment, the invention provides a method for configuring a controller to operate a motor to position a seat, the controller including an integrated current sensor, the seat including a latch operatively coupled to the motor. The method includes determining an operating profile of the motor under one or more operating conditions, wherein the operating profile represents motor current values during activation of the latch, and wherein the activation of the latch includes at least one latch pulling condition and one latch release condition. The method further includes analyzing the operating profile in order to correlate the profile to the position of the latch. The method also includes loading the controller with instructions to enable comparison of a real-time current measured by the integrated current sensor to the stored operating profile, wherein the analysis enables determination of the latch condition in real-time.

In another embodiment, the invention provides a method for controlling the operation of a motor to position a seat. The seat includes a latch operatively coupled to the motor. The motor includes a controller with an integrated current sensor and a pre-determined operating profile of the motor during operation of the latch. The method includes initiating operation of the motor and obtaining real-time motor current values from the current sensor. The method includes comparing the motor current values to the pre-determined operating profile. The method also includes determining if the latch has released and, based on the determination, ceasing or continuing operation of the motor.

In another embodiment, the invention provides a remote release actuating system for releasing a vehicle seat latch. The seat latch is coupled to a cable including at least one latch pulling condition and one latch release condition. The system includes a gear assembly including a gear case containing a transmission. The gear assembly is coupled to the cable. A biasing member is configured to bias the cable in a first position. A motor has an output shaft operatively coupled to the gear assembly. The motor further includes a power supply with a solid state switch and an integrated current sensor to provide a measurement of the current flowing to the motor. A controller has memory loaded with an operating profile of the motor and is configured to compare the current obtained from the current sensor to the operating profile and determine the state of the latch without the use of a position sensor.

BRIEF DESCRIPTION OF THE DRAWINGS

FIG. 5 is a partial perspective view of the remote release actuating system of FIG. 1 with the spool removed.

FIG. 6 is a partial perspective view of the remote release actuating system of FIG. 1 with the gear case cover removed.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
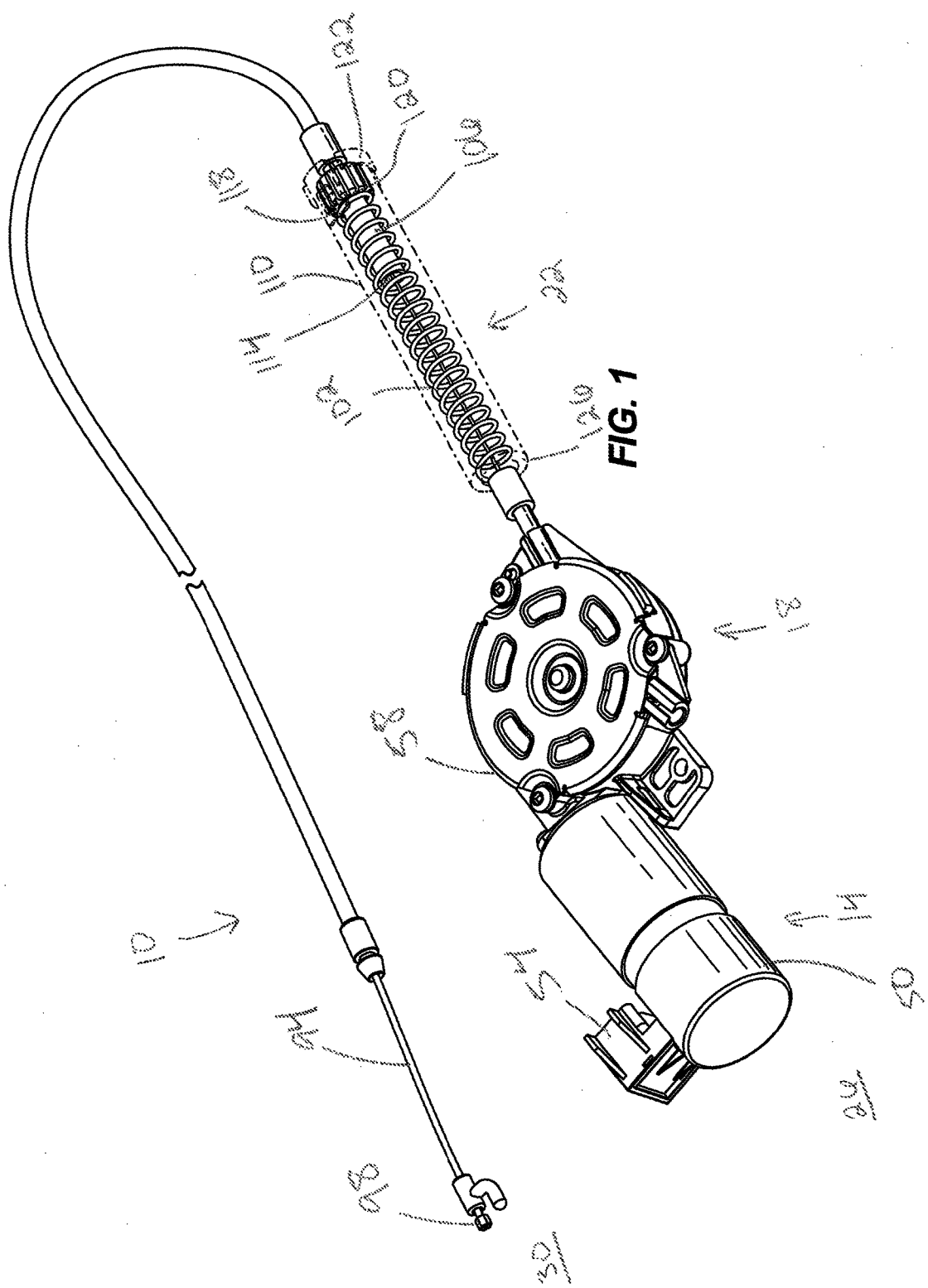
FIG. 1 is a perspective view of a remote release actuating system.

FIG. 1 illustrates a position-sensorless remote release actuating system 10 including a motor assembly 14, a gear assembly 18, and a biasing assembly 22 referenced with respect to a proximal end 26 and a distal end 30 of the system 10. The system 10 will be described herein for implementation with a vehicle, but is not so limited in its application.

Figure 2:
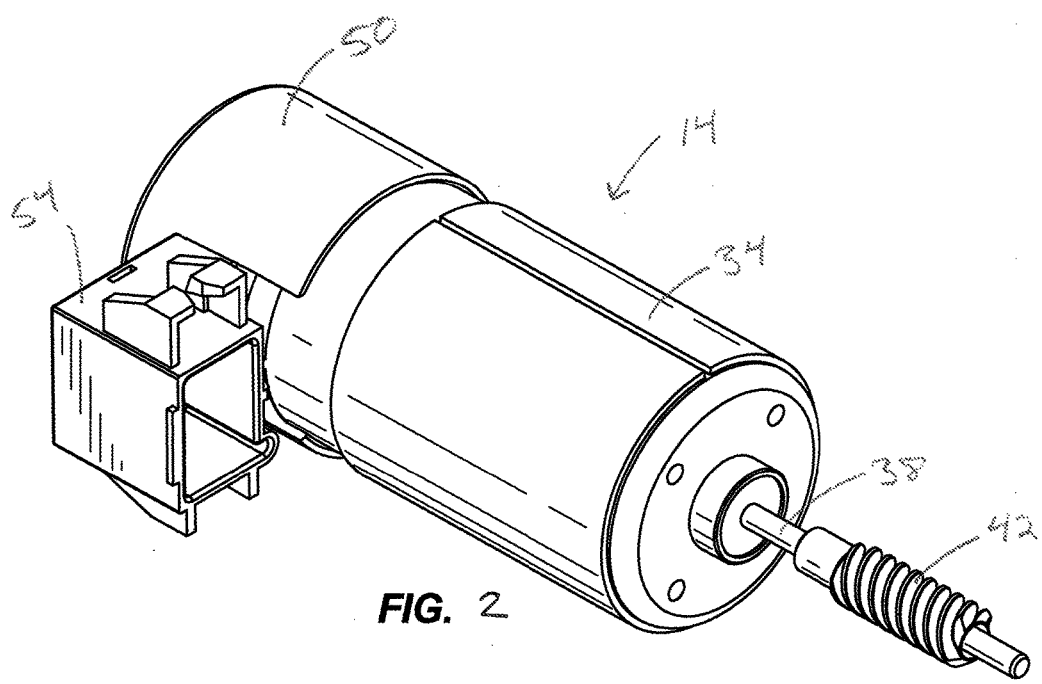
FIG. 2 is a perspective view of the motor assembly of the remote release actuating system of FIG. 1.
Figure 3:
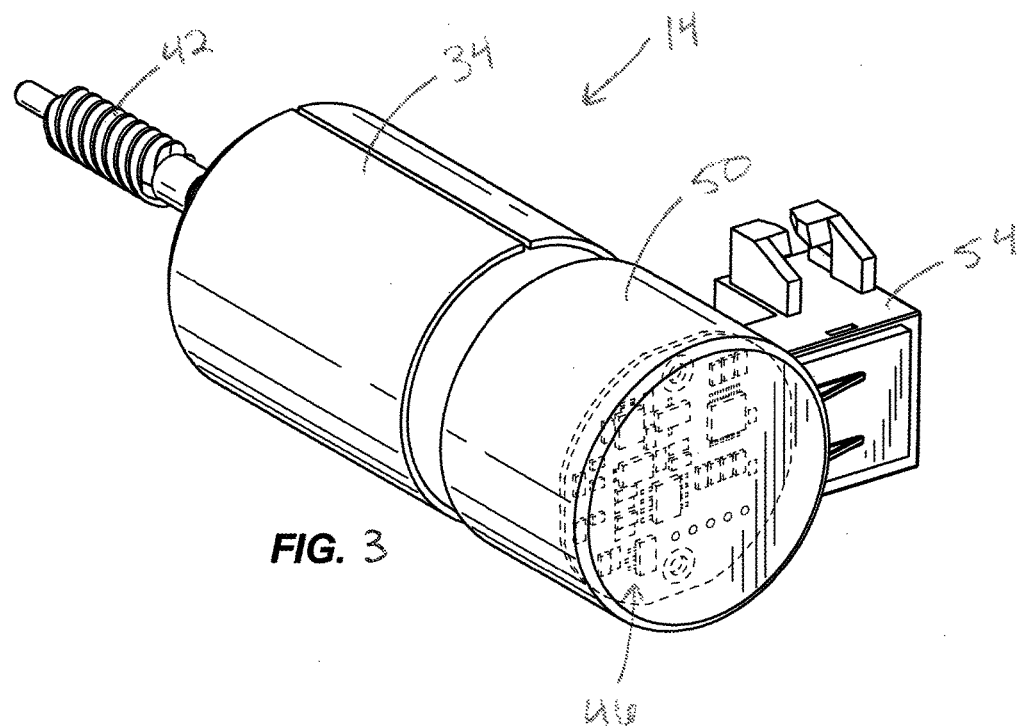
FIG. 3 is another perspective view of the motor assembly of FIG. 2.

Referring to FIGS. 2 and 3, the motor assembly 14 includes a motor 34 with an output shaft 38 and a worm gear 42 secured thereto for co-rotation. The motor assembly 14 further includes a circuit assembly 46, the details of which will be further described below, with a circuit casing 50 at least partially covering the circuit assembly 46 to provide protection from the external environment. An electrical terminal 54 receives electrical power for operation of the motor assembly 14, the source of which can be, for example, derived directly from the vehicle such as through the vehicle's power circuit.

Figure 4:
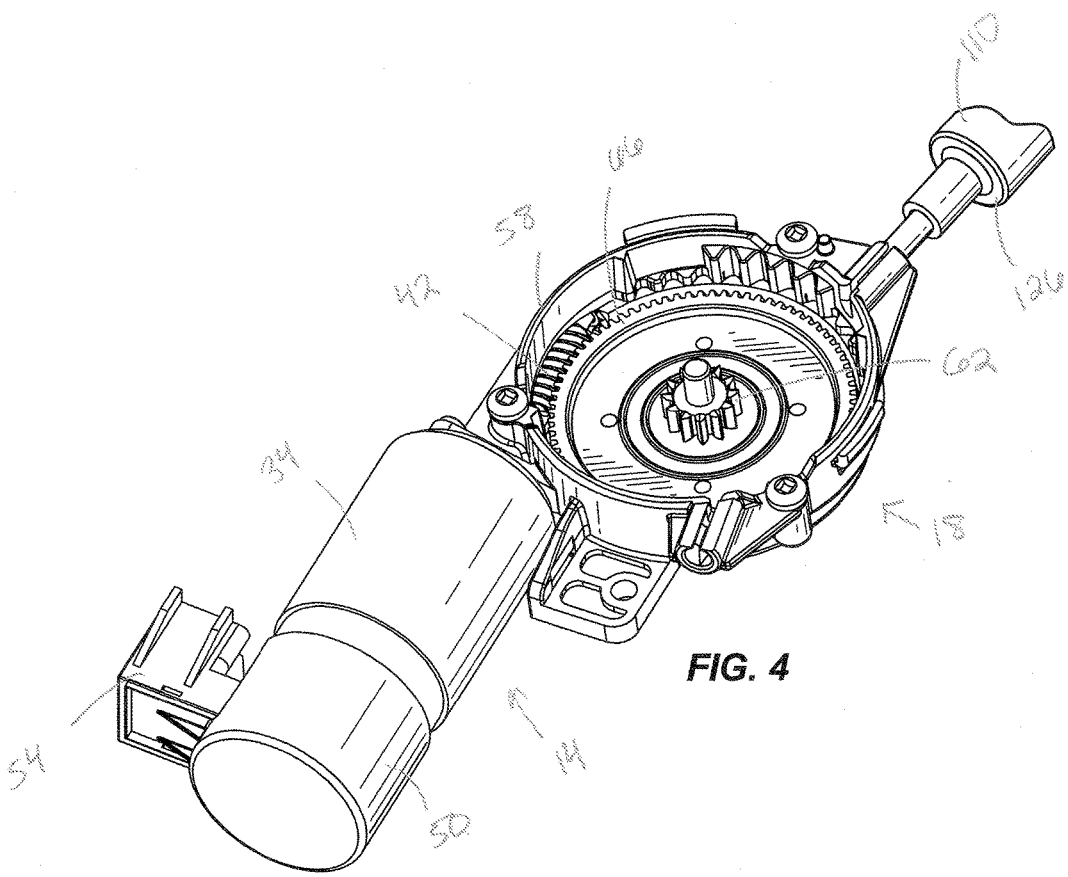
FIG. 4 is a partial perspective view of the remote release actuating system of FIG. 1 with select transmission components removed.
Figure 7:
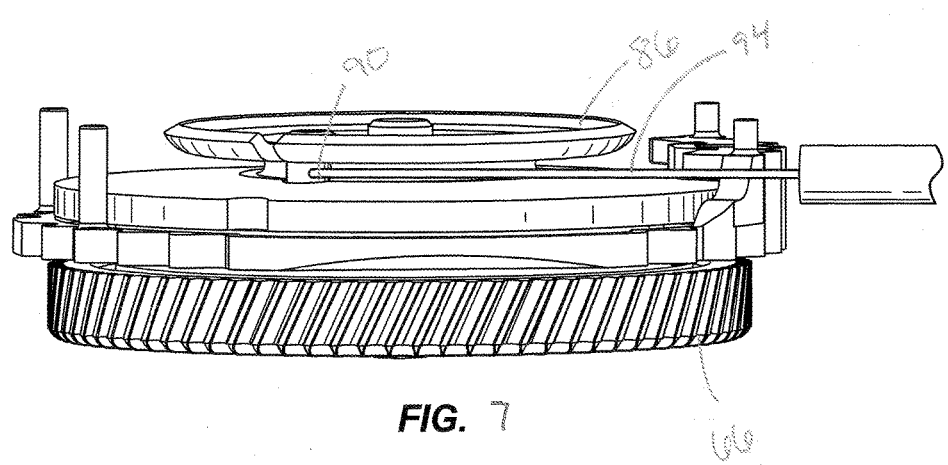
FIG. 7 is another partial perspective view of the remote release actuating system of FIG. 1.

Referring to FIGS. 4-6, the gear assembly 18 is coupled to the motor assembly for transferring motive force from the output shaft 38. As shown in FIG. 4, a gear case 58 of the gear assembly 18 contains a sun gear 62 integrally formed with an input gear 66, which is configured to engage the worm gear 42. Referring to FIG. 5, the sun gear 62, together with planet gears 70 and a ring gear 74, forms a planetary gear transmission 78. A driving surface 82 positioned on the ring gear 74 rotates when the worm gear 42 drives the transmission 78. The driving surface 82 engages and rotates a spool 86 mounted substantially coaxially with the sun gear 62, as shown in FIG. 6. Referring also to FIG. 7, the spool 86 secures a proximal end 90 of a cable 94, which is thereby wound and unwound about the spool 86 during operation.

Referring again to FIG. 1, a distal end 98 of the cable 94 is coupled to a seat latch (not shown), such that the act of winding the spool 86 retracts the cable 94 into the gear case 58 and moves the latch from a first locked position to a second retracted position and, in some embodiments, to a third retracted position. For example, a two-stage latch, found in many vehicle seat applications, refers to a mechanism with two discrete latches, or a single latch with two different latch stages or positions, to be released consecutively via actuation of a single cable. Such a latch can move a seat from an upright position to a folded position and from a folded position to a "tumbled" position.

The biasing assembly 22 includes a biasing member 102 in the form of a compression spring, a plunger 106, and a housing 110 coaxially encasing the spring 102, the plunger 106, and a portion of the cable 94. The plunger 106 includes an aperture 114 through which a portion of the cable 94 passes and is secured for movement therewith. The plunger 106 includes a flange 118 presenting a surface 120 on which the spring 102 is engaged such that retraction of the cable 94 compresses the spring 102 as the plunger 106 moves from a distal end 122 toward a proximal end 126 of the housing 110. The spring compression biases the plunger 106 and correspondingly the cable 94 into a first position during retraction of the cable 94 into the gear case 58. In an alternative embodiment, the biasing assembly 22 as previously described is replaced with a biasing member in the form of a torsional spring (not shown) positioned within the gear case 58 and mounted coaxially with the sun gear 62.

Figure 8:
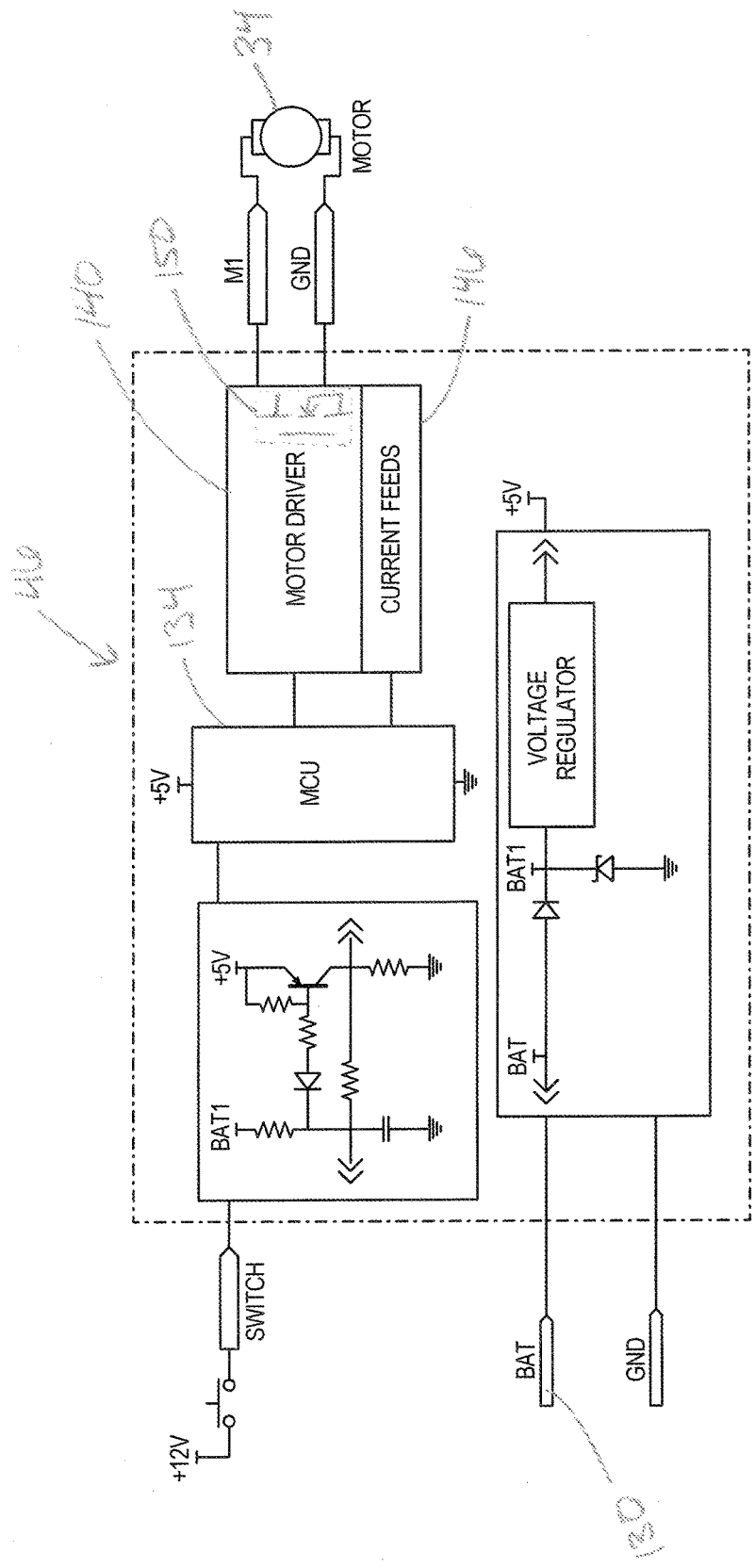
FIG. 8 is a schematic view of portions of the remote release actuating system circuit assembly.

Referring to FIGS. 2, 3, and 8, the circuit assembly 46 further includes a power supply in the form of a battery 130 coupled to the electrical terminal 54. A controller 134 controls the supply of power to the motor 34. A motor driver 140 includes a switch 150 such as a solid state switch (e.g., a MOSFET) with a gate for receiving a signal from the controller 134 to control the operation of the switch, either open or closed. The motor driver 140 includes an integrated current sensor 146 proximal the electrical switch to provide a measurement of the current flowing to the motor 34. The current sensor 146 provides feedback that the controller 134 processes to determine the current level flowing though the electrical switch. The controller 134 includes a processor for carrying out real-time calculations (e.g. control algorithms) and memory for storing information (e.g. motor parameters).

Electrical current levels to the motor 34 change as the corresponding load (seat latch positions) driven by the motor 34 changes. As will be further described below, the controller 134 releases the latch by comparing real-time electrical current measurements from the sensor 146 with a previously generated current waveform representative of unlatching the seat latch through its course of travel.

Figure 9:
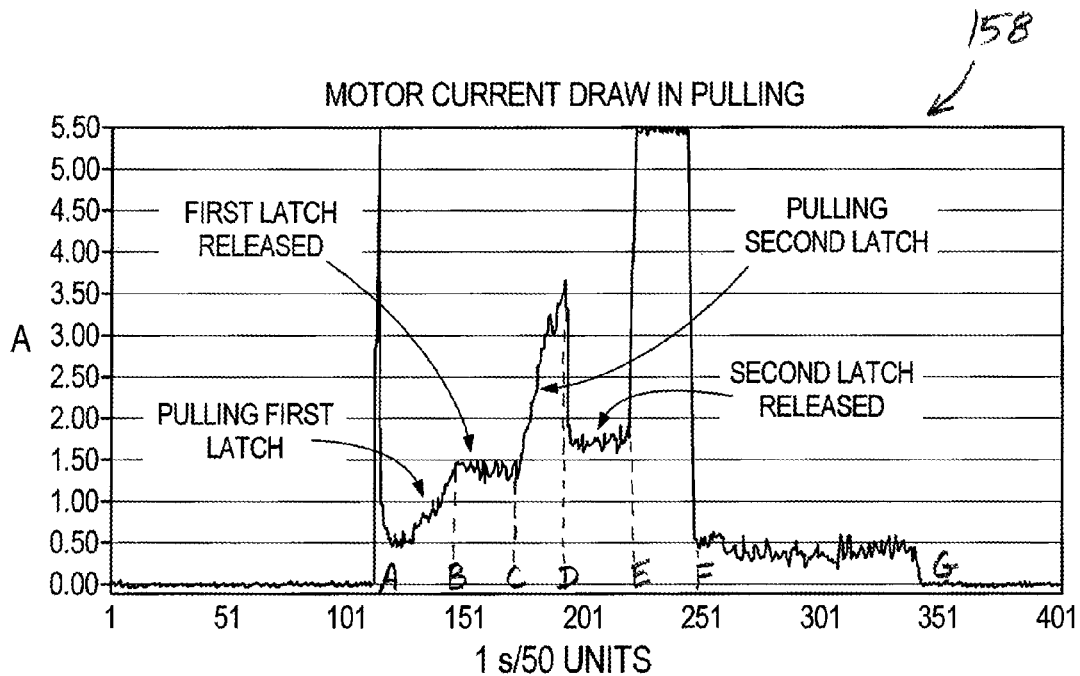
FIG. 9 is a plot of an electrical current operating profile of a motor without the remote release actuating system of FIG. 1.

FIG. 9 illustrates a current waveform, or profile 158 of a motor current as a function of time for the unlatching of a two-stage latch. As illustrated, the motor current value differs as the two-stage latch moves from a locked position (A) to a first unlocked position (B) in which the back of the seat is foldable, and from there to a second unlocked position (D) in which the entire seat can tumble forward. The electrical current drawn by the motor as the latch moves from a first position to a second position and/or a third position is unique and depends on both the latch and the operating conditions.

Figure 11:
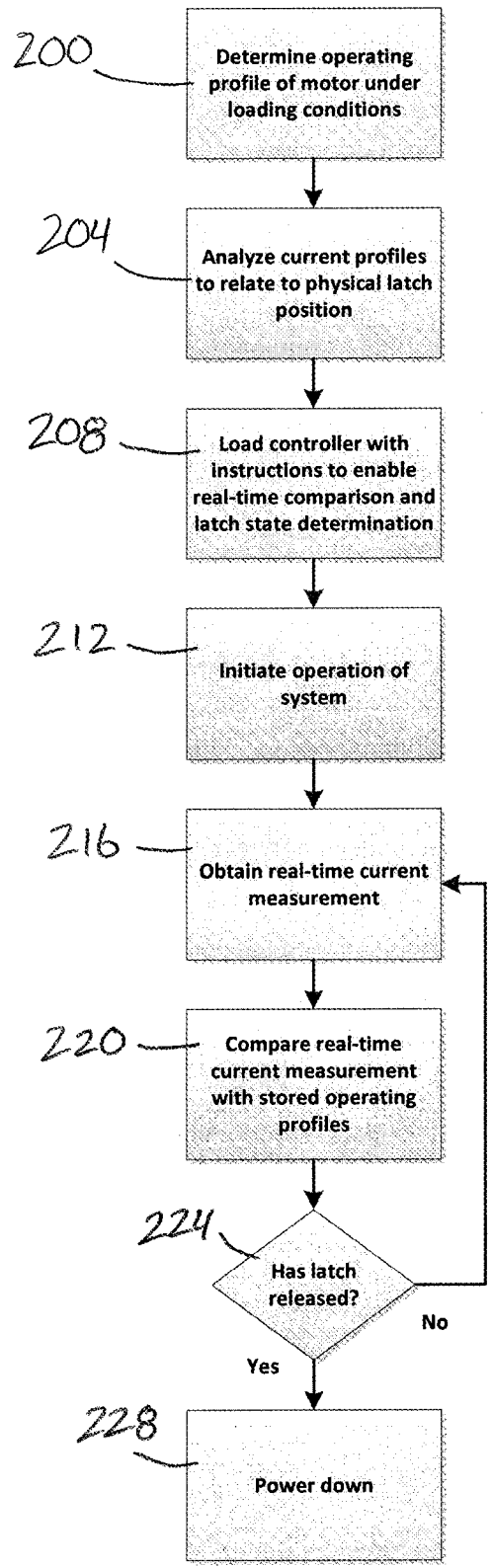
FIG. 11 is a flow chart of process steps embodying the invention.

With reference to FIG. 11, to utilize the characteristics of the motor's current waveform during operation, the controller 134 is configured to record the measured electrical current from the current sensor 146 during a testing procedure of the motor assembly 14 (step 200). Specifically, electrical current from the integrated current sensor 146 is measured and recorded through the full range of motion for an identified latch mechanism. Because changes in the load from the latch, the operating temperature, the operating life, and/or the supplied voltage can alter the current profile 158 of the motor, testing is done for a plurality of operating conditions in various combinations. The recorded current profiles from testing at different operating conditions provide a set of data representing the motor operational characteristics during release of the latch.

Once recorded by the controller 134 this motor current data set is separately analyzed (e.g., using an external computer) in order to ascertain how it relates to the physical latch position (step 204). The current data exhibits recognizable characteristics (e.g., spikes, valleys, and plateaus) as a function of time. These characteristics include not only the values of the current over time but the changes in current levels within a certain time period (i.e., the slope of the current, di/dt) and are correlated directly with specific positions of the latch during the course of motor operation. Referring again to FIG. 9, an analysis of the current profile 158 demonstrates that the first stage of the two-stage latch is pulled at time A and released at time B. Following the release of the first stage latch, the second stage is pulled at time C and subsequently released at time D. Such an analysis thereby establishes an operating profile of the motor 34 for the latch that takes into account various operating conditions. This is saved into the controller memory 154.

The processor is loaded with instructions to enable comparison of the real-time current to the stored information using a pattern recognition technique (to, for example, calculate the rate of change of electrical current with respect to time) (step 208). In an alternative embodiment, the rate of change of electrical current can be calculated in hardware (e.g. analog circuits) in place of calculating the same using the processor.

In operation, upon input by the user to position a seat, (e.g., through a push button) the controller 134 operates the power supply 130 to provide power to the motor 34 (step 212) and rotate the worm gear 42. The worm gear 42 drives the transmission 78, which rotates the spool 86 to wind the cable 94 thereon, retracting it into the gear case 58. As the cable 94 is retracted into the gear case 58, the plunger 106 of the biasing assembly 22 moves with the cable 94, compressing the spring 102 as the plunger 106 slides within the spring housing 110.

As the cable 94 retracts, it activates the latch through one or more stages. The controller 134 accesses the operating profile information from memory 154 and compares the electrical current measurements obtained from the current sensor 146 in real-time (step 216), and in view of the operating time, to the stored operating profile information during the entire operation of the motor 34 (step 220). The controller 134 identifies when the latch is being pulled to a release point and when the latch has been released (e.g., when a single stage latch has been released or when the first and second stages of a two-stage latch have been released) (step 224). The controller 134 continues to operate the motor 34 and measures the current (step 216). After ascertaining that the latch has been released at step 224, the controller 134 controls the power supply 130 to remove power from the motor 34, ceasing rotation of the worm gear 42 (step 228). With no power supplied to the motor assembly 14, the spool 86 is free to rotate and, under the biasing force of the spring 102, rotates in the opposite direction as the cable 94 unwinds back to the first position. The cable 94 therefore moves from the retracted position to the first position without assistance from the motor 34.

Referring again to FIG. 9, without the control system of the invention, shortly after full release of the second latch (or position) of a two-stage latch, the cable reaches the end of its travel. Without proper control, the motor 34 remains powered and proceeds to a stall condition at time E after the second stage is released at time D (through a "hard stop" at the end of travel for the latch). A stall condition can damage and reduce the life of the motor 34. Specifically, at time E, the motor enters a current limiting state and only then does the controller, after a time lag as illustrated, power down the motor 34 at time F. The motor shortly thereafter comes to a complete halt at time G.

Figure 10:
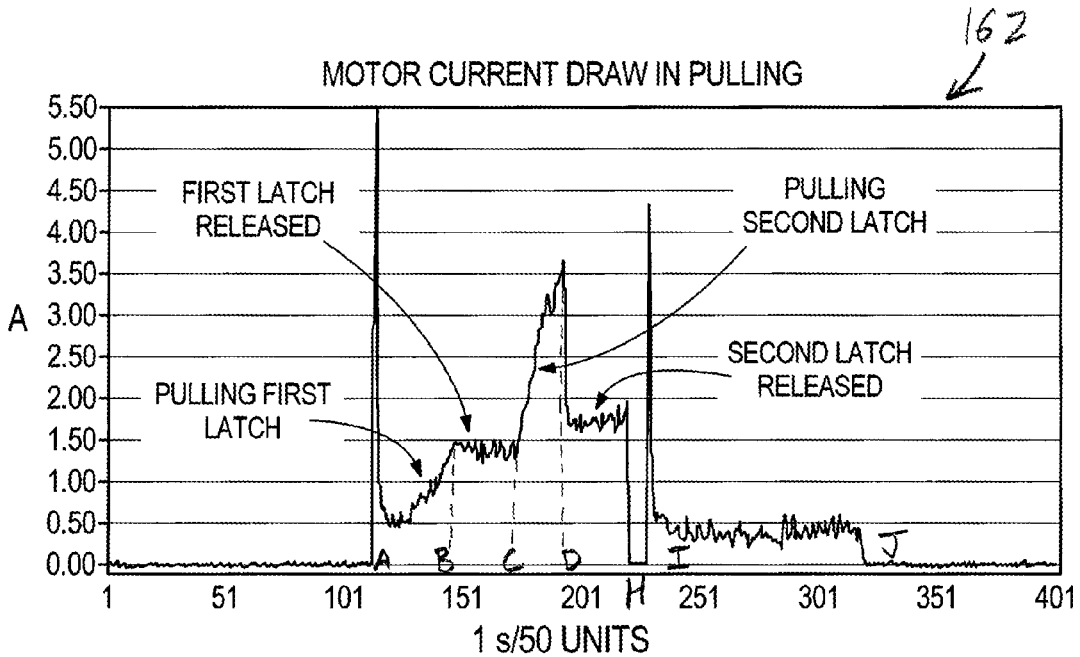
FIG. 10 is a plot of an electrical current operating profile of a motor with the remote release actuating system of FIG. 1.

A recorded current profile 162 of the motor 34 with the controller 134 and method embodying the present invention is illustrated in FIG. 10. The latch is determined to be released by the controller 134 after the real-time comparison of the measured electrical current and the stored information from testing identifies the level, rate of change, and timing of the electrical current as matching the corresponding physical release of the latch for the given operating conditions. The current profile 162 eliminates the current limit condition at time E in FIG. 9 by powering down the motor 34 at time H before a stall condition occurs. By stopping the motor 34 before the actuator assembly 10 is fully retracted, the motor 34 is protected from the damaging stall current condition resulting from continuing to power the motor 34 after the latch has been released. Specifically, at time H, the controller 134 determines the latch has been released (step 224) and powers down the motor 34 (step 228) allowing the biasing assembly 22 to act at time I. Following the return of the cable 82 to the first position, at time J the motor 34 has stopped rotating.

To account for variability over time, a learning algorithm can be loaded onto the processor 150 to compensate for the load changes in the latch (for example, at step 208). The learning algorithm recognizes if the motor assembly 14 was powered for too long or not long enough based on the measured electrical current at the end of every actuation cycle and makes necessary adjustments during the subsequent actuation cycle. For example, if the motor 34 experienced a current limit in the previous actuation cycle as a result of a hard stop, then the controller 134 will, in the following actuation cycle, power down the motor 34 at an earlier point in time to keep the current within an acceptable range.

As a result of being able to analyze the current profile 162 to determine if and when the latch releases, the recorded operating profiles in combination with the current readings from the sensor 146 can be substituted for conventional position feedback signals (e.g. from an encoder, resolver, Hall-effect sensor, potentiometer, etc.), reducing component costs and potential failure and saving space in any given application.

Various features and advantages of the invention are set forth in the following claims.

What is claimed is:

1. A method for configuring a controller and operating a motor to position a seat, the controller including an integrated current sensor, the seat including a latch operatively coupled to the motor, the method comprising:
   determining an operating profile of the motor under one or more operating conditions, wherein the operating profile represents motor current values during activation of the latch, and wherein the activation of the latch includes at least one latch pulling condition and one latch release condition;
   analyzing the operating profile in order to correlate the profile to the position of the latch;
   loading the controller with instructions to enable comparison of a real-time current measured by the integrated current sensor to the stored operating profile;
   operating the motor to activate the latch; and
   based on a comparison by the controller of real-time current measured and the stored operating profile, determining the latch condition in real-time.

2. The method of claim 1, wherein loading the controller with instructions further includes loading the controller with instructions configured to permit adjustment by the controller of the operation of the motor to maintain the real-time current within an acceptable range.

3. The method of claim 1, wherein determining the operating profile of the motor under one or more operating conditions includes determining the operating profile for a variation in operating load of the latch.

4. The method of claim 1, wherein determining the operating profile of the motor under one or more operating conditions includes determining the operating profile for a variation in a power supply voltage to the motor.

5. The method of claim 1, wherein determining the operating profile of the motor under one or more operating conditions includes determining the operating profile for a variation in operating temperature of the motor.

6. The method of claim 1, wherein determining the operating profile of the motor under one or more operating conditions includes determining the operating profile for a projected operating life of the motor.

7. The method of claim 1, wherein the at least one latch pulling condition and one latch release condition includes a first latch pulling condition followed by a first latch release condition, and wherein the first latch release condition is followed by a second latch pulling condition.

8. The method of claim 7, wherein the second latch pulling condition is followed by a second latch release condition.

9. A method for controlling the operation of a motor to position a seat, the seat including a latch operatively coupled to the motor, the motor including a controller with an integrated current sensor and with a pre-determined operating profile of the motor during operation of the latch, the method comprising:
   initiating operation of the motor;
   obtaining real-time motor current values from the current sensor;
   comparing the motor current values to the pre-determined operating profile;
   based on the comparison of the motor current values to the pre-determined operating profile, determining if the latch has released; and
   based on the determination, ceasing or continuing operation of the motor.

10. The method of claim 9, wherein ceasing or continuing operation of the motor means ceasing operation of the motor when the comparison indicates the latch has released.

11. The method of claim 9, wherein the latch operatively coupled to the motor is a two-stage latch, and wherein ceasing or continuing operation of the motor means ceasing operation of the motor when the comparison indicates the latch has released at a second stage.

12. The method of claim 9, further including obtaining the operating time of the motor and comparing the operating time with the operating profile.

13. The method of claim 9, further including calculating the time rate of change of the current and comparing the time rate of change of the current to the operating profile.

14. A remote release actuating system for releasing a vehicle seat latch, the seat latch coupled to a cable including at least one latch pulling condition and one latch release condition, the system comprising:
- a gear assembly including a gear case containing a transmission, the gear assembly coupled to the cable;
- a biasing member configured to bias the cable in a first position; and
- a motor having an output shaft operatively coupled to the gear assembly, the motor further including
  - a motor driver with a solid state switch and an integrated current sensor to provide a measurement of the current flowing to the motor; and
  - a controller loaded with an operating profile of the motor, the controller configured to compare the current obtained from the current sensor to the operating profile and determine the state of the latch without the use of a position sensor.

15. The system of claim 14, wherein the transmission is defined by a plurality of gears in a planetary gear arrangement.

16. The system of claim 14, further including a spool operatively coupled to the transmission within the gear case, wherein the spool secures an end of the cable.

17. The system of claim 14, wherein the biasing member is in the form of a compression spring.

18. The system of claim 14, wherein the biasing member is in the form of a torsion spring positioned within the gear case.

* * * * *